(12) United States Patent
Kato et al.

(10) Patent No.: US 7,082,660 B2
(45) Date of Patent: Aug. 1, 2006

(54) RECYCLING METHOD AND IMAGE FORMING APPARATUS MANUFACTURED USING RECYCLING METHOD

(75) Inventors: Takayuki Kato, Kashiwa (JP); Yasuyoshi Yamamoto, Moriya (JP); Masahiro Funakoshi, Toride (JP); Masaaki Saito, Tokyo (JP); Ikuo Takeuchi, Toride (JP); Shinsuke Ubayashi, Kashiwa (JP); Naoya Kikkawa, Toride (JP); Akihiro Shimizu, Kashiwa (JP); Hideaki Miyazawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 10/225,242

(22) Filed: Aug. 22, 2002

(65) Prior Publication Data
US 2003/0044198 A1  Mar. 6, 2003

(30) Foreign Application Priority Data

| Aug. 24, 2001 | (JP) | ............................. 2001-254021 |
| Sep. 11, 2001 | (JP) | ............................. 2001-274813 |

(51) Int. Cl.
*B07B 13/00* (2006.01)
*B23P 19/00* (2006.01)

(52) U.S. Cl. ................... 29/401.1; 29/426.2; 29/403.1; 399/109

(58) Field of Classification Search ............... 29/403.1, 29/403.3, 426.1–426.6, 401.1; 399/109
See application file for complete search history.

(56) References Cited

U.S. PATENT DOCUMENTS

| 5,475,472 | A |   | 12/1995 | Saito et al. .................. 355/219 |
| 5,669,042 | A |   | 9/1997  | Kobayashi et al. ......... 399/111 |
| 5,691,807 | A | * | 11/1997 | Fuei et al. ................... 399/130 |
| 5,983,059 | A | * | 11/1999 | Oka et al. .................... 399/262 |
| 2003/0059229 | A1 | * | 3/2003 | Yamamoto et al. ......... 399/109 |
| 2004/0009002 | A1 | * | 1/2004 | Mori et al. .................... 399/75 |
| 2004/0047648 | A1 | * | 3/2004 | Saito et al. .................. 399/109 |
| 2004/0091282 | A1 | * | 5/2004 | Yokoi .......................... 399/109 |
| 2005/0249520 | A1 | * | 11/2005 | Yamamoto et al. ......... 399/109 |

FOREIGN PATENT DOCUMENTS

| CN | 1086024 A | 4/1994 |
| CN | 1125855 A | 7/1996 |
| EP | 0 634 260 A2 | 1/1995 |
| JP | 5-69282 A | 3/1993 |
| JP | 06-138729 A | 5/1994 |
| JP | 06-246256 A | 9/1994 |
| JP | 8-323337 | 12/1996 |
| JP | 11-108020 A | 4/1999 |

OTHER PUBLICATIONS

English translation of CN1125855A, Jul. 1996.*
V. Berko-Boateng, et al., IEEE International Symposium on Electronics and the Environment (May 10-12, 1993), "Asset Recycle Management–A total Approach to Product Design for the Environment", pp. 19-31.

* cited by examiner

*Primary Examiner*—David P. Bryant
(74) *Attorney, Agent, or Firm*—Fitzpatrick, Cella, Harper & Scinto

(57) ABSTRACT

A recycling method of an apparatus having a part includes a collecting step of collecting a part from the apparatus; a processing step of processing the collected part to adapt it to an apparatus having different specifications; and a mounting step of mounting the part processed in the processing step on the apparatus.

12 Claims, 8 Drawing Sheets

RECYCLING METHOD AND IMAGE FORMING APPARATUS MANUFACTURED USING RECYCLING METHOD

FIELD OF THE INVENTION AND RELATED ART

The present invention relates to a recycling method (re-manufacturing method: REM or RMF), in which products used in the marketplace are recovered, disassembled, sorted, and reassembled to manufacture products virtually identical to the original, or products different from the original. In particular, it relates to an image forming apparatus recycling method.

It has been a common practice for manufacturers to recover their used products from the marketplace, due to environmental concerns. The recovered used products were disassembled, and sorted. The components which could be reused as they were, were reused. Some of those which could not be reused as they were, were used as the material for new products, or used as fuel, and the others were dumped after being reduced in volume by pulverization, burning, or the like.

In the past, however, the usage of the recycled products has been limited to the remanufacture of the products identical to the recovered products, or the products which share common components with the recovered products. In other words, the number of the recyclable products has been limited.

Further, recycling incurs the expense for recovery and disassembly, as well as the expense for determining whether or not the recovered used products are reusable. Thus, not all products have been recycled; some of them have been dumped.

Further, the amount of recyclable products has been limited. Therefore, the amount of recyclable products necessary to be recovered for recycling has fluctuated. In other words, as the amount of a shipment decreased, there was an excessive number of the recovered recyclable products, whereas as the number of shipments increased, there was a shortage of the recovered recyclable products (in other words, a shortage of recovered reusable components), forcing the manufacturers to use brand-new components for the remanufacture of the recyclable products. In other words, a fresh supply of recyclable components has been manufactured for the purpose of remanufacture. Further, as the products of the next generation come onto the market after the ending of the manufacture of the preceding generation resulting from the drop in the prices of the preceding generation, the recovered recyclable products of the preceding generation and/or the components therefrom could not be used, ending up in the dump. In addition, the processes used for recycling the recyclable products of the preceding generation had to be modified for the recyclable products of the new generation. This generational switch resulted in additional waste products.

SUMMARY OF THE INVENTION

The primary object of the present invention is to provide a recycling method which makes it possible for a recovered component to be reused not only for the remanufacture of an apparatus identical in specification to the product from which the component was extracted, but also for the manufacture of products different in specification from the product from which the component was extracted, and also, to provide an image forming apparatus which can be remanufactured or manufactured using such a recycling method.

According to one of the preferable embodiments of the present invention for accomplishing the above described object, a method for recycling an apparatus comprising a plurality of components comprises: a recovery process for extracting components from a single or plurality of recovered apparatuses; a processing process for processing the extracted components in order to make the extracted components meet the changes in the apparatus specifications; and an attaching process for attaching the extracted components having been processed in the processing process, to the single, or plurality of the apparatuses from which they were removed.

According to another of the preferable embodiments of the present invention, an image forming apparatus comprising a plurality of components is recyclable through the following processes: a recovery process for extracting components from a single or plurality of recovered apparatuses; a processing process for processing the extracted components in order to make the extracted components meet the changes in the apparatus specifications; and an attaching process for attaching the components having been processed in the processing process, to the single, or plurality of the apparatuses from which they were removed.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Figure 1:
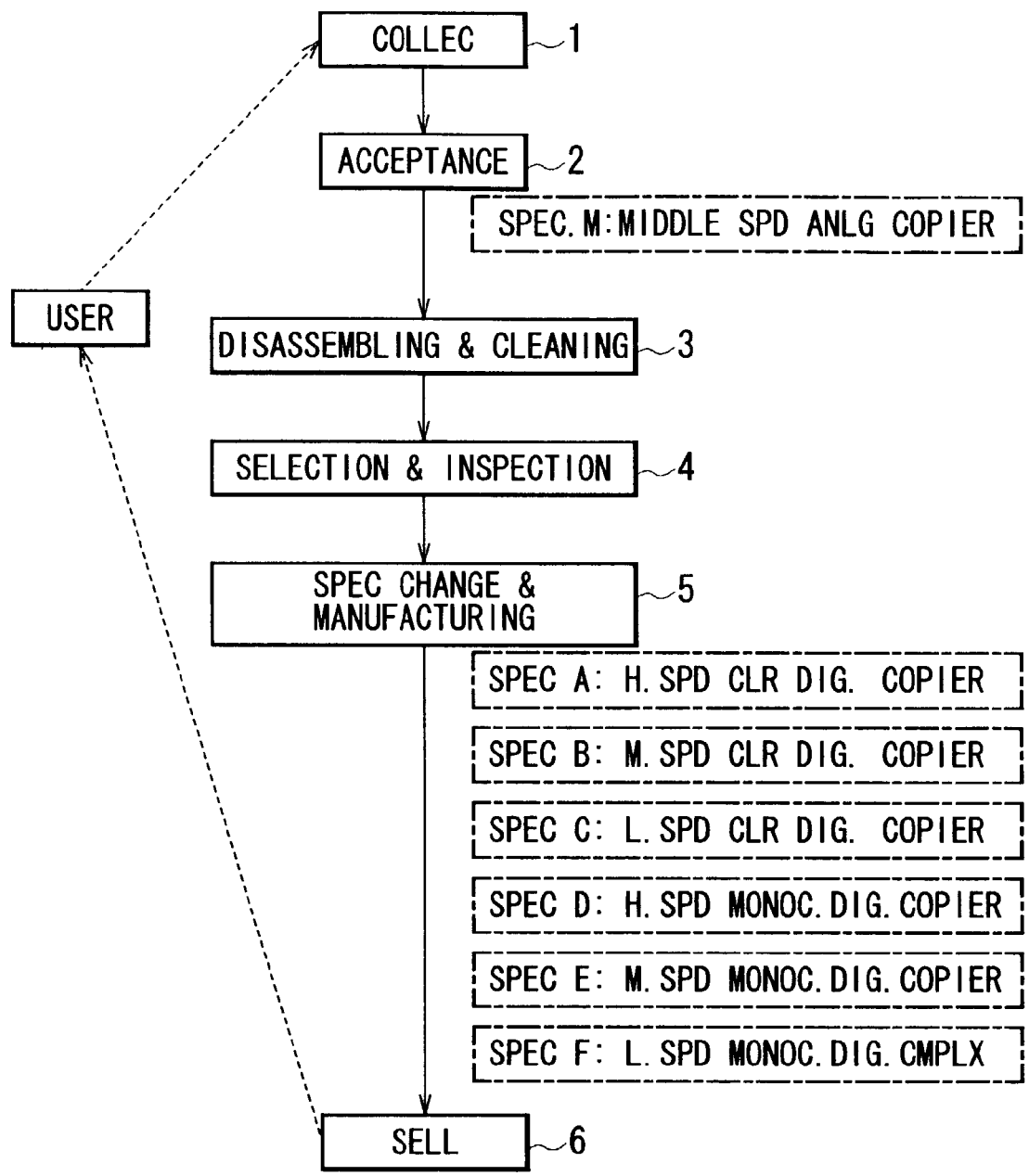
FIG. 1 is a flowchart for showing an image forming apparatus recycling process.

FIG. 1 is a chart for an image forming apparatus recycling method in accordance with the present invention. Designated by reference numerals 1, 2, 3, 4, 5, and 6 are: a recovering process; a receiving process; a disassembling/cleansing process; a sorting/examining process; a specification modifying/manufacturing process; and a selling process, respectively.

The products recovered from users are processed in the receiving process 2; they are subjected to a simple examination to determine their specifications. For example, some of them are classified as an M type: black-and-white analog copying machine.

After being classified as the M type, they are transferred to the disassembling/cleansing process 3, in which they are disassembled into frames, units, components, and the like, and are cleansed.

In the sorting/examining process 4, the frames, units, components, and the like, disassembled from the recovered apparatuses are checked for defects, and then, are sorted. Those with problems are repaired for reuse.

Then, those restored to the state in which they can be reused, are sent to the specification modifying/manufacturing process 5.

In the specification modifying/manufacturing process 5, their specifications are modified to specifications different from the specifications to which they belonged when they were attached to the original apparatuses. For example, the new specifications are: specification A: high speed digital color copying machine; specification B: medium speed digital color copying machine; specification C: low speed digital color copying machine; specification D: high speed digital black-and-white copying machine; specification E: medium speed digital black-and-white copying machine; specification F: low speed digital black-and-white copying machine; and the like.

Incidentally, specification modification adds to the cost of some of the aforementioned processes. Thus, the specifications may be modified to increase the values of the apparatuses of the next generation, so that the profitability can be secured by the value added by the specification modification made in these processes, in spite of the cost increases incurred by the specification modification.

The modifying/manufacturing process 5 prevents the usage of the recovered components from being limited to the remanufacturing of product identical to the products from which the components were recovered. In other words, it makes it possible for the recovered components to be used for apparatuses other than the apparatuses from which they were extracted. Thus, even if the number of manufactured units of one of the various models of apparatuses fluctuates, the frames, units, components, and the like from the recycled apparatuses of this model can be used for the manufacturing of the other models, stabilizing the recycling operation.

Also, with the provision of the modifying/manufacturing process 5, even after the apparatuses of the new generation take over the markets toward the end of the life cycle of the apparatuses of the preceding generation, those recovered from the apparatuses of the preceding generation can be used for the manufacturing of the new generation, extending the service lives of the components from recyclable apparatuses.

Further, the provision of the process 5 makes it unnecessary for the other processes in the recycling method to be modified, eliminating the waste traceable to the product cycle of an apparatus.

The products manufactured through the specification modifying/manufacturing process are sold to users (selling process 6).

Figure 2:
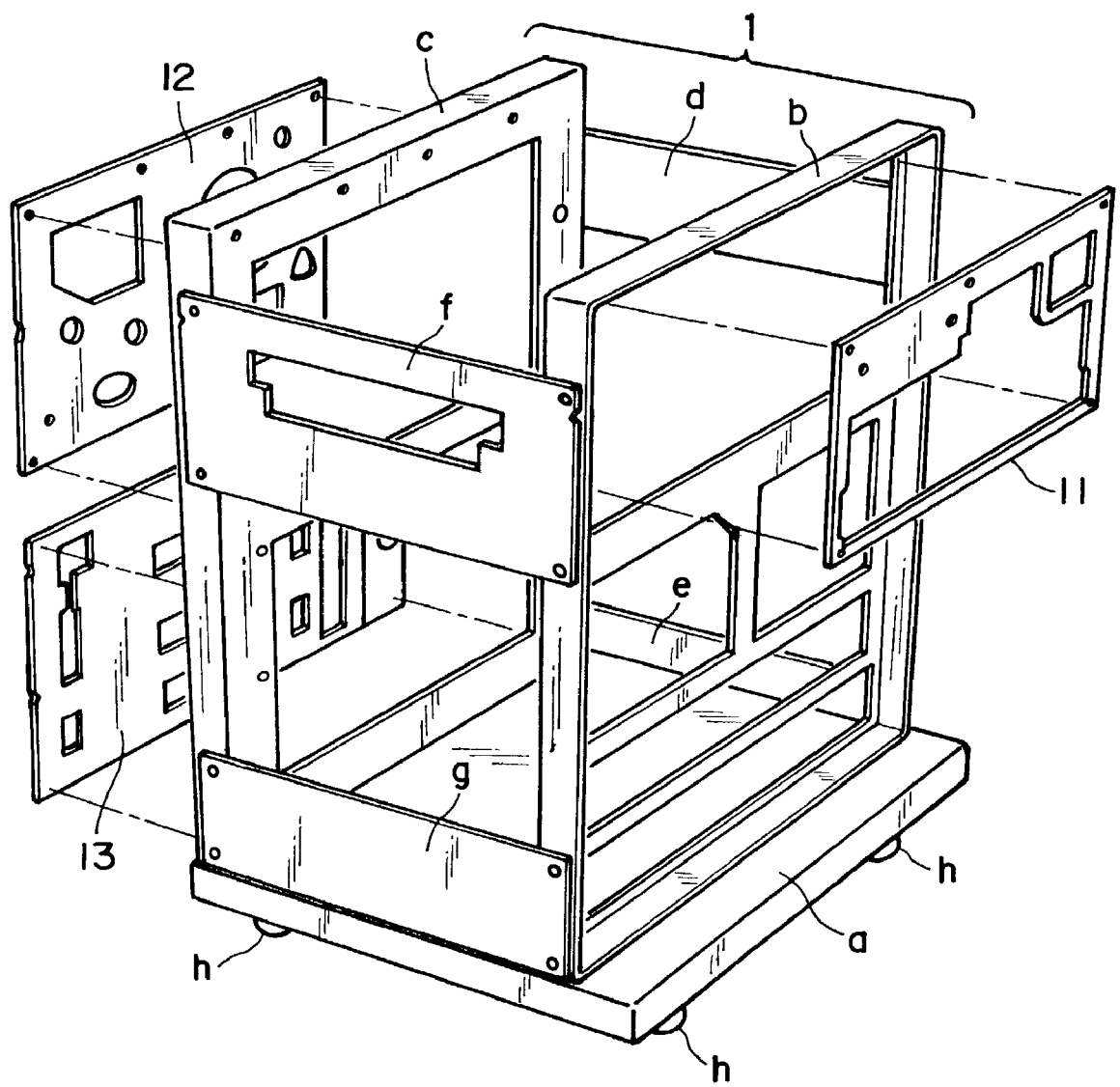
FIG. 2 is a perspective view showing an example of a specification modifying/manufacturing process.
Figure 3:
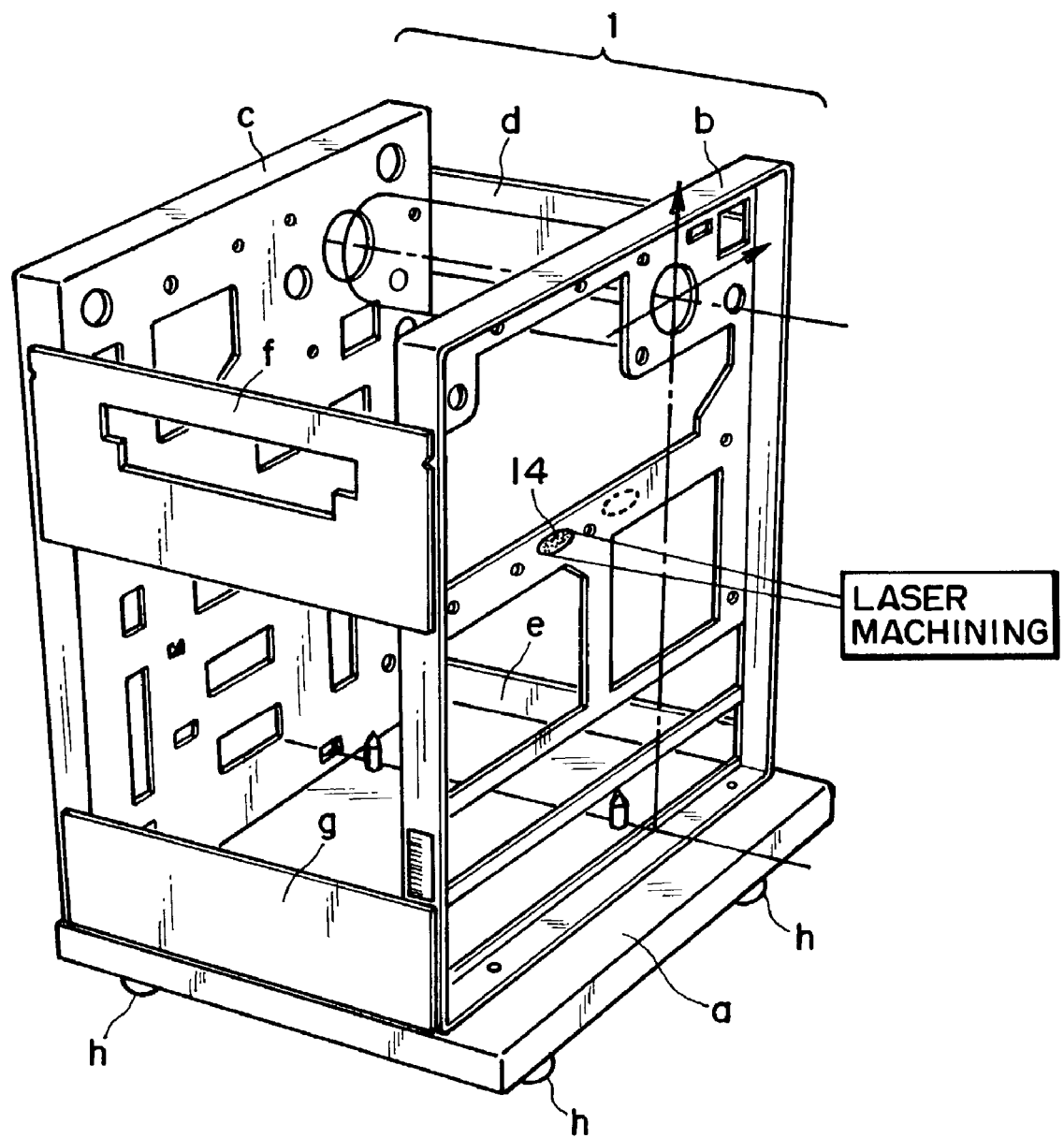
FIG. 3 is a perspective view showing another example of a specification modifying/manufacturing process.
Figure 4:
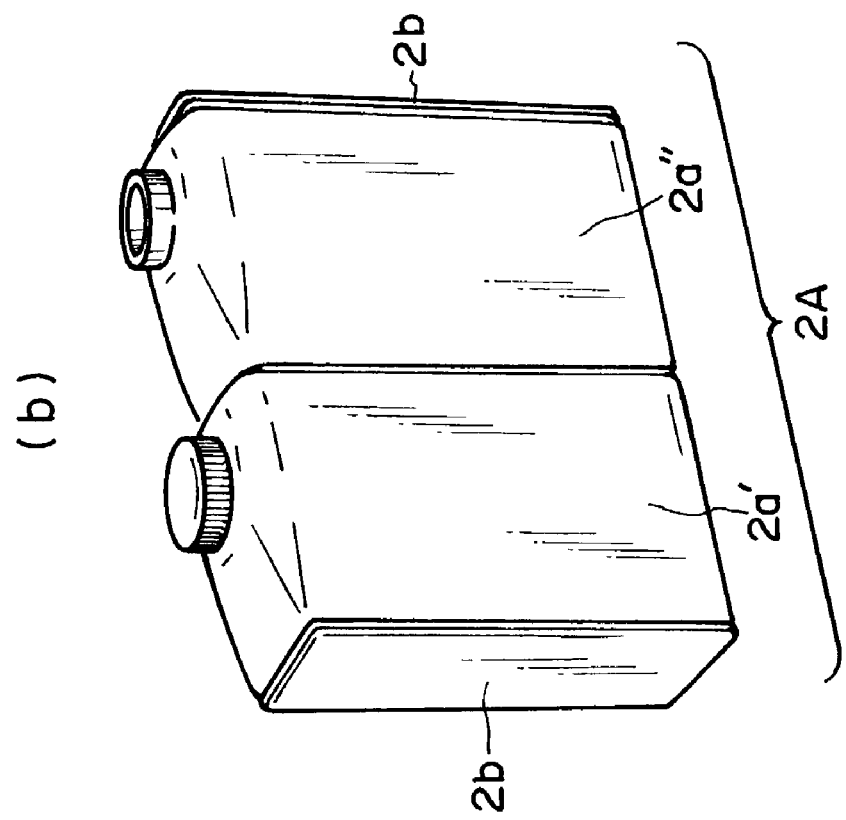
FIG. 4 is a schematic drawing for showing another example of a specification modifying/manufacturing process.
Figure 4:
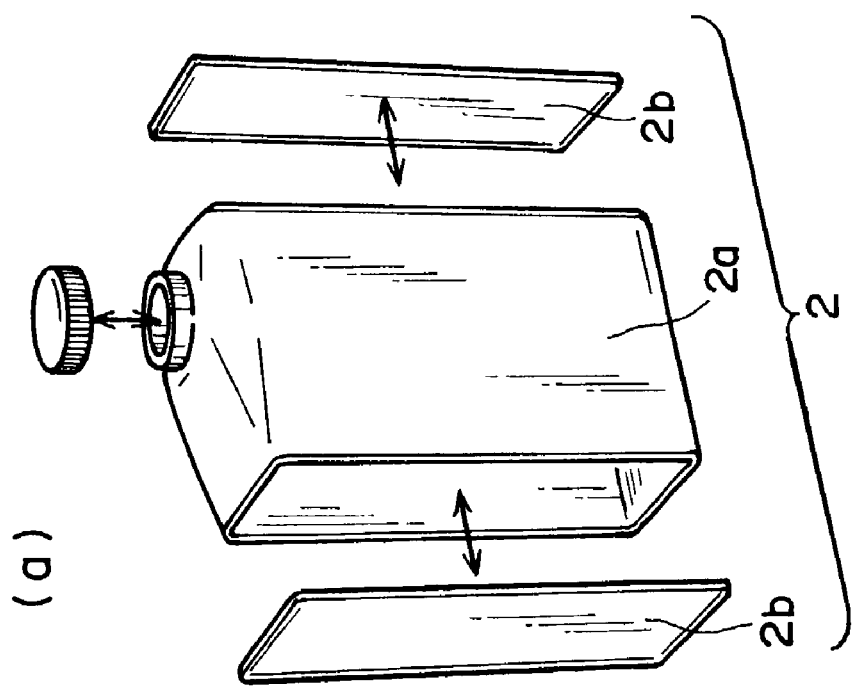

FIGS. 2–4 show examples of the specification modifying/manufacturing process.

EXAMPLE 1 OF SPECIFICATION
MODIFYING/MANUFACTURING PROCESS
(FIG. 2)

In this example, a recovered image forming apparatus is disassembled, and the components therefrom are sorted. Then, the original front, back, and side plates are removed from the frame 1, and front, back, and side plates 11, 12, and 13, respectively, different in specification from the original plates removed from the frame 1 are attached to the frame 1 to make the frame 1 reusable.

Referring to FIG. 2, designated respectively by reference letters a, b, and c are: bottom plate, front plate, and back plate, of the frame 1. Designated respectively by reference letters d and e are a top right stay and a bottom right stay, to which the front and rear plates a and c are solidly fixed, whereas designated respectively by reference letters f and g are a top left stay and a bottom left stay, to which the front and back plates b and c are solidly fixed. Designated by a reference letter h is a caster attached to the bottom plate a of the frame 1.

The recovered frame is modified in specification so that after the modification, the recovered frame matches the specification of an image forming apparatus of the next generation, that is, the generation after the generation to which the image forming apparatus from which the frame was removed belongs. After the modification, the recovered frame is reused for manufacture of an image forming apparatus of the next generation. Sometimes, the recovered frame is modified in specification so that after the modification, the recovered frame matches the specification of a modified version of an image forming apparatus of the same generation. After the modification, the recovered frame is reused for the manufacture of a modified version of an image forming apparatus of the same generation.

The component anchoring portion of the recovered frame 1, to which a recovered and modified component, or a brand-new component, is attached, may be the same as the component anchoring portion of the recovered frame 1, from which the original component was removed, or the frame 1 may be provided in advance with a plurality of component anchoring portions, to which a component, which is the same in function but is different in specification, can be attached, so that the recovered and modified component, or a brand-new component, which is substantially the same in function as the original component but is different in specification, can be readily attached to the recovered frame to manufacture a product different in specification from the product from which the frame 1 was extracted. Further, a product may be designed so that the modified version of a given original component of the product, or a brand new component which replaces the given original component, can be readily attached to the component anchoring portion of the frame, from which the original component was removed, and that the component anchoring portion of the frame to which the given original component is attached is made different from the component anchoring portions to which the components other than the given component are attached.

EXAMPLE 2 OF SPECIFICATION
MODIFYING/MANUFACTURING PROCESS
(FIG. 3)

In this example, a recovered image forming apparatus is disassembled, and the components therefrom are sorted. Then, a portion 14 of the frame 1 is processed by a laser to make the frame 1 reusable. In other words, the recovered frame 1 is modified in specification by a laser in order to make the frame 1 reusable for the manufacture of a product different in specification from the product from which the frame 1 was removed.

That is, in order to make the frame 1 from a recovered image forming apparatus of the preceding generation meet the specification of an image forming apparatus of the next generation, the portion 14 of the frame 1 of the recovered image forming apparatus is processed so that the frame 1 from the recovered image forming apparatus of the preceding generation can be used for the manufacture of an image forming apparatus of the next generation, or in order to make the frame 1 of the recovered image forming apparatus of the preceding generation meet the specification of a modified version of an image forming apparatus of the same generation, the portion 14 of the frame is processed so that the frame 1 from the recovered image forming apparatus can be used for the manufacture of a modified version of an image forming apparatus of the same generation.

EXAMPLE 3 OF SPECIFICATION
MODIFYING/MANUFACTURING PROCESS
(FIG. 4)

In this example, in order to use a plurality of recovered components to produce a component different in specification from the plurality of components, the plurality of recovered components are combined in a manner different from the manner in which they were originally combined.

Referring to FIG. 4(a), the recovered waste toner container 2 can be cut into three pieces: a main section 2a, a left plate 2b, and a right plate 2b. Next, referring to FIG. 4(b), a main section 2a', the right plate of which has been removed, and a main section 2a'', the left plate of which has been removed, are connected (gluing or welding) by the edges of their openings created by the removal of their side plates, to produce a waste toner container 2A different in specification from an original waste toner container, that is, a waste toner container larger in capacity.

As described above, this example is a method for using a plurality of recovered components to produce a new component (2A) different in specification from any of the recovered components.

Embodiment 1

The recovered products can be used for the manufacture of products different from the recovered products, as well as the manufacture of products identical to the recovered products. In either case, certain components (for example, frame) of a recovered product cannot be reused in the original shape; they cannot be reused unless they are modified in shape. In other words, sometimes, the components from recovered products need to be processed, in addition to being simply cleaned. For example, when processing the main frame of a recovered product for reuse, it is necessary to have a reference for attaining positional accuracy. However, it has not been common practice to set a universal positional reference for different products. Therefore, it takes a substantial amount of labor to process a recovered component, in particular, when using the recovered component for the manufacture of a product different from the product from which the component was recovered. The recycling cost reflects this additional labor.

Further, in the case that a recovered component has been modified in shape twice or more, it is not easy to obtain the information regarding to what extent the recovered component has been modified. Therefore, the sorting of the recovered components, and the selecting of an appropriate modifying process based on the sorting, become complicated. This results in confusion when reusing the recovered components.

The following embodiments of the present invention represent the methods, in accordance with the present invention, for easily and highly precisely processing the main frame of a recovered product so that the recovered components can be reused for a wide range of products.

Next, referring to the appended drawings, the preferable embodiments of the present invention will be described in detail. Incidentally, the measurements, materials, and shapes, of the structural components, and their positioning relative to each other, which will be mentioned in the following descriptions of these embodiments, are not intended to limit the scope of the present invention to those of the embodiments which will be described next, unless specifically noted.

Figure 5:
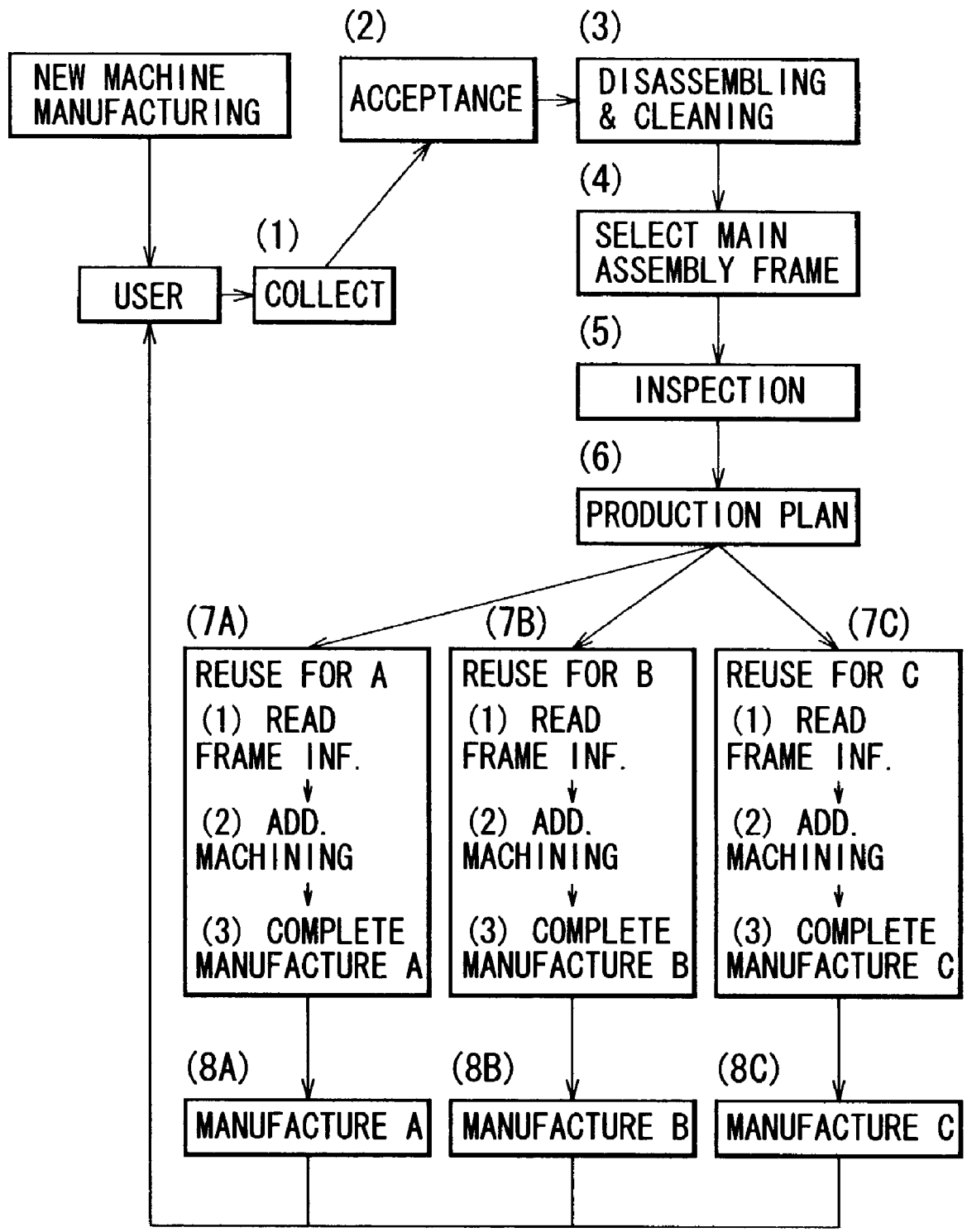
FIG. 5 is a flowchart for showing another image forming apparatus recycling process.

FIG. 5 is a chart for showing the gist of the present invention, that is, a method for recycling the main frame of an image forming apparatus in accordance with the present invention. In other words, FIG. 5 does not show the methods for processing the components and units other than the main frame.

First, a product is recovered from a user (recovering process 1), and basic judgments are made regarding product type, operability, deformation, breakage, and the like to determine whether or not the recovered product is reusable (receiving process 2). Then, the main frame of the product is extracted (disassembling/cleansing process 3), and is checked for deformation, breakage, and the like to determine whether or not it is reusable (examining process 5). If the main frame is judged reusable, it is assigned to the manufacture of one of the products (A, B, or C in this embodiment) based on a production plan (6). Then, the main frame is processed, being changed in specification so that it meets the specification of the main frame of the product (one of A, B, and C) to which it was assigned (process 7A, 7B, or 7C). In this process, first, the data regarding the shape of the recovered main frame are read (data reading process (1)), and the main frame is processed, based on the read data, to modify its shape (modifying process (2)). These data are configuration data used to determine: whether or not the recovered component (main frame) is exactly the same as the component of a product to which it has been assigned; whether or not the recovered component has been modified in shape due to the design changes or the like made during the current model cycle; in what stage of modification the recovered component is in terms of the design changes in the current model cycle; and the like matters. Based on these data, it is determined what part or parts of the recovered frame are processed, and how. Obviously, the decision includes the case in which the recovered frame does not need to be processed, in other words, it can be reused as it is. After being completed in compliance with the required specification (completing process (3)), the recovered frame is brought back to a user through one of manufacturing processes (8A, 8B, and 8C) corresponding to the products (A, B, and C), respectively.

Next, the processes (7A, 7B, and 7C) carried out for reusing the recovered main frame will be described in more detail.

Figure 6:
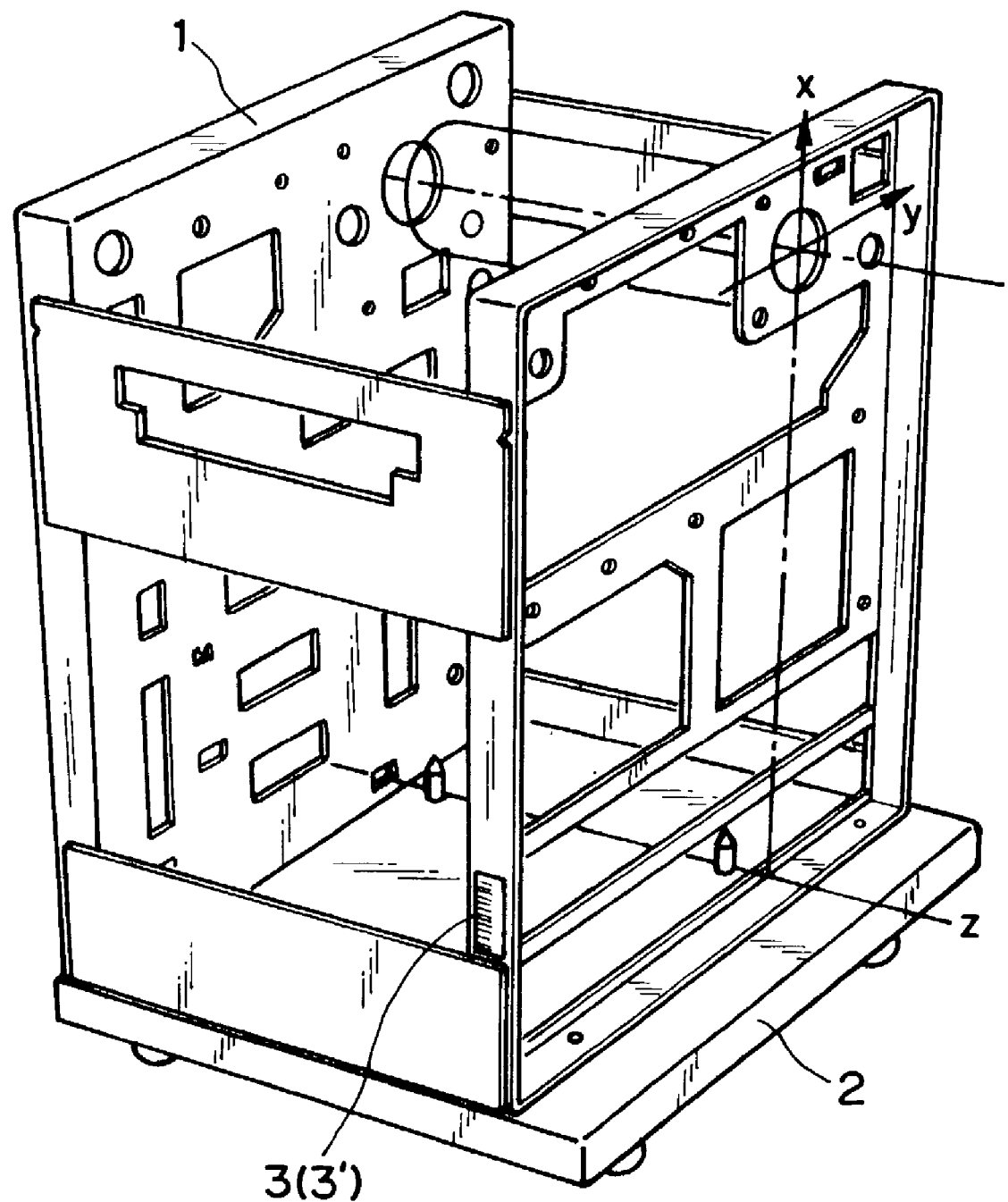
FIG. 6 is a perspective view of the frame of the main assembly in the first embodiment of the present invention, and a frame dolly.

FIG. 6 is a perspective view of an example of a recovered main frame accepted for one of the processes (7A, 7B, and 7C) carried out for reusing the recovered main frame.

The recovered main frame 1 is placed on a frame dolly 2, and is sent to a NC laser based processing machine (unshown). First, the bar code of a label 3, that is, a data displaying member, pasted on the main frame 1 is read. The bar code provides the data regarding the shape of the main frame 1, inclusive of the model of the product from which the main frame 1 was removed, in what stage of modification the main frame 1 is in terms of shape (how many times the main frame 1 has been reprocessed since it was originally manufactured), and the like information. In other words, the bar code provides the information based on which it is determined what part or parts of the recovered main frame 1 are to be processed, and how, to make the recovered main frame 1 meet the specification necessary for its reuse. After reading these data, the CPU of the NC laser based processing machine determines what part or parts of the recovered main frame 1 are to be processed, and begins to process the frame 1. The main frame 1 has positional references, which were provided, in anticipation of the need for additional laser based processing, when the main frame 1 was originally manufactured (x, y, and z in drawing). In this embodiment, for example, x, y, and z axes, which intersect each other at the center of the hole of one of the side plates of the main frame 1, are set as the positional references. This hole is such a hole that is used to support a photoconductive drum 40 as an image bearing member. The portion or portions of the recovered main frame 1, which need to be modified, are processed with reference to these axes. More specifically, the program for searching the portion or portions of the recovered main frame 1 to be modified, based on the data obtained from the bar code of the pasted label 3, and the program for processing the recovered main frame 1 in accordance with the set positional references, have been inputted in advance in the CPU of the NC laser based processing machine. Thus, the recovered main frame 1 delivered to one of the modification processes (7A, 7B, and 7C) is instantly and properly processed to make it usable as the main frame for an intended product.

Further, after the recovered main frame 1 is modified for reuse, a label 3' which shows the shape of the recovered and modified main frame 1 is pasted to the recovered and modified main frame 1, to make this information readily available for the next processing of the main frame 1.

As described above, according to this embodiment, in anticipation of the eventual reprocessing of the main frame 1, the aforementioned positional references (x, y, and z) are set, and the label 3 which provides the information regarding the shape of the main frame 1 is pasted to the main frame 1, when the frame 1 is originally manufactured. Therefore, as the main frame 1 is recovered, it can be efficiently processed for reuse as described above.

Embodiment 2

Figure 7:
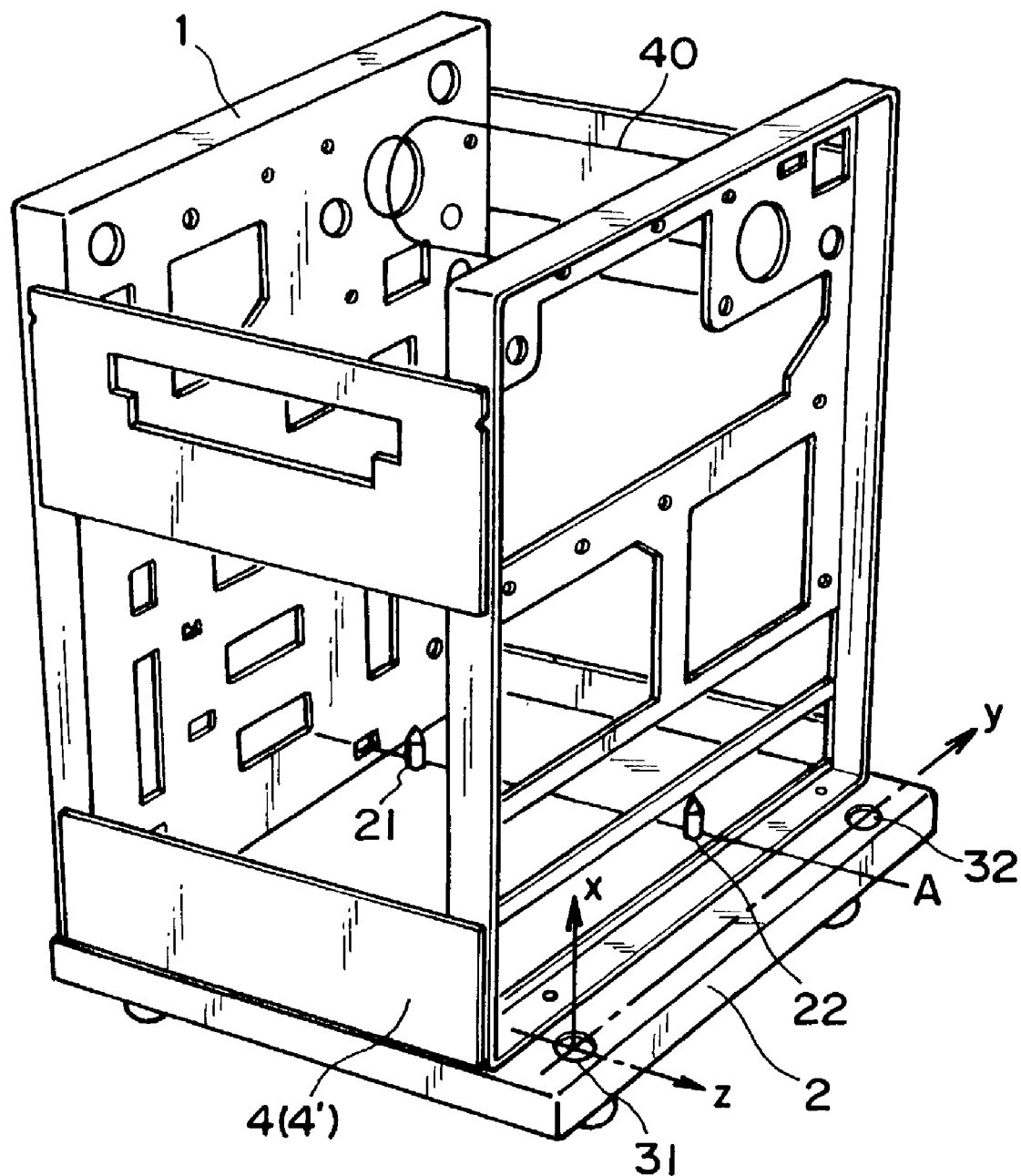
FIG. 7 is a perspective view of the frame of the main assembly in the second embodiment of the present invention, and a frame dolly.

FIG. 7 is a perspective view of another example of a recovered main frame accepted for one of the processes (7A, 7B, and 7C) carried out for reusing the recovered main frame.

The recovered main frame 1 is placed on a frame dolly 2, and is sent to a NC laser based processing machine (unshown). Next, the code 4, which had been carved or pressed into the surface of the main frame 1, is read, and the read information is keyed into the CPU of the laser based processing machine. This carved or pressed code 4 provides the data regarding the shape of the main frame 1, inclusive of the model of the product from which the main frame 1 was removed, in what stage of modification the main frame 1 is in terms of shape (how many times the main frame 1 has been reprocessed since it was originally manufactured), and the like information. In other words, the code 4 provides the information based on which it is determined what part or parts of the recovered main frame 1 are to be processed, and how, to make the recovered main frame 1 meet the specification necessary for its reuse. The CPU of the NC laser based processing machine determines what part or parts of the recovered main frame 1 are to be processed, and begins to process the frame 1. As shown in FIG. 7, the main frame 1 has been attached to the frame dolly 2, being precisely positioned relative to the dolly 2 by the frame anchoring portion A with two pins 21 and 22, and the dolly 2 is provided with positional references (x, y, and z in drawing). In this embodiment, the main frame 1 has positional references, which were provided, in anticipation of the need for additional laser based processing, when the main frame 1 was originally manufactured (x, y, and z in drawing). In this embodiment, three axes are set as the positional references by the provision of two holes 31 and 32. The portion or portions of the recovered main frame 1, which need to be modified, are processed with reference to these positional references. More specifically, the program for searching the portion or portions of the recovered main frame 1 to be modified, based on the data obtained from the bar code of the pasted label 3, and the program for processing the recovered main frame 1 in accordance with the positional references set on the dolly 2, have been inputted in advance in the CPU of the NC laser based processing machine. Thus, the recovered main frame 1 delivered to one of the modification processes (7A, 7B, and 7C) is instantly and properly processed to be reused as the main frame for an intended product.

Further, after the recovered main frame 1 is modified for reuse, a code 4', which shows the shape of the recovered and modified main frame 1, is carved or pressed into the recovered and modified main frame 1, to make this information readily available for the next processing of the main frame 1.

As described above, according to this embodiment, the universal frame dolly 2 used with the laser based processing machine is provided with the above described positional references, and the code 4 (4') regarding the main frame shape is carved or stamped into the main frame. Therefore, as the main frame 1 is recovered, it can be efficiently processed for reuse as described above.

The means for providing the main frame with the information regarding the main frame configuration does not need to be limited to the pasting of a label coded for providing the information, to the main frame, and the carving or stamping of the code for providing the information, into the main frame. For example, the information may be directly printed on the main frame with the use of ink or the like, or the main frame may be provided with a memory in which the information can be stored.

Figure 8:
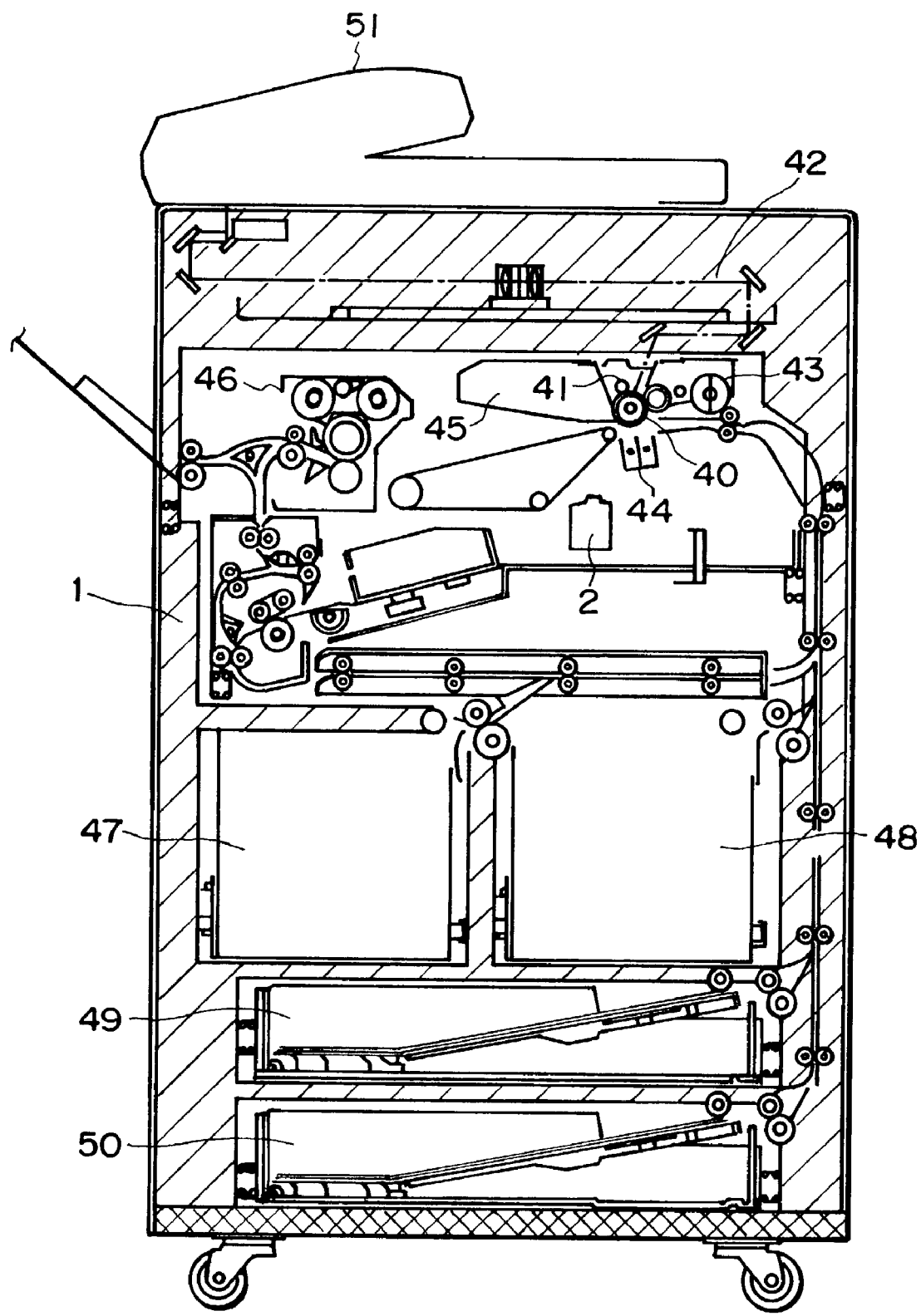
FIG. 8 is a sectional view of an example of an image forming apparatus.

FIG. 8 shows an example of an image forming apparatus to which the above described recycling method is applicable. The image from an original delivered to the reading portion from the original feeding apparatus 51 is read by the reading/exposing apparatus 42, and is projected onto the peripheral surface of the photoconductive drum 40 having been charged by the charging means 41, forming an electrostatic latent image. The latent image is developed into a toner image, by the developing means 43. The toner image is transferred by the transferring means 44 onto the transfer medium delivered from one of cassettes 47, 48, 49, and 50. The transferred toner image is fixed to the transfer medium by the fixing means 46. The transfer residual toner particles, that is, the toner particles remaining on the peripheral surface of the photoconductive drum 40 after the toner image transfer, are recovered by the cleaning means 45. The recovered transfer residual toner particles are conveyed to the waste toner container 2 by the unshown waste toner conveying means, and collected therein. The above described various means of this image forming apparatus are supported by the main frame 1 of the image forming apparatus.

While the invention has been described with reference to the structures disclosed herein, it is not confined to the details set forth, and this application is intended to cover such modifications or changes as may come within the purposes of the improvements or the scope of the following claims.

What is claimed is:

1. A recycling method of an image forming apparatus having a first part, comprising:
    a collecting step of collecting the first part from the apparatus;
    a processing step of processing the first part to adapt it to an apparatus having different specifications, including processing a part of a mounting portion of the first part so that the mounting portion is capable of mounting a second part into the collected first part;
    a mounting step of mounting the second part in the first part after the part of the mounting portion is processed in said processing step;
    a mounting step of mounting the processed first part on the apparatus having different specifications; and
    an assembling step of assembling the apparatus having different specifications using the first part having been processed by said processing step.

2. A method according to claim 1, wherein a positional reference usable in said processing step is provided on the first part.

3. A method according to claim 1, wherein in said processing step, the part is placed on a processing table, and a positional reference usable in said processing step is provided on the processing table.

4. A method according to claim 1, wherein the first part has information relating to itself.

5. A method according to claim 4, wherein the information relates to a use history of the first part or a nature of the apparatus having the first part to which the second part is mounted in said mounting step.

6. A method according to claim 4, further comprising an information reading step of reading the information, and wherein in said processing step, a processing configuration or position is determined on the basis of the information.

7. A method according to claim 4, wherein the first part is provided with a display member which displays the information.

8. A method according to claim 7, wherein the display member is a label.

9. A method according to claim 7, wherein the display member is a label having the information in the form of a bar code.

10. A method according to claim 4, wherein the information is engraved on the first part.

11. A method according to claim 4, wherein the information is directly printed on the first part.

12. A method according to claim 1, wherein the first part is a frame of the apparatus.

* * * * *